US012812016B2

(12) United States Patent
Gale et al.

(10) Patent No.: US 12,812,016 B2
(45) Date of Patent: Nov. 24, 2026

(54) PUBLISH/SUBSCRIBE MESSAGING WITH DYNAMIC LATENCY CONTROLLED COMBINING

(71) Applicant: CRADLEPOINT, INC., Boise, ID (US)

(72) Inventors: Tom Gale, Boise, ID (US); Sabrina McIntyre, Eagle, ID (US); Brandon Parker, Boise, ID (US); Casey Kesler, Meridian, ID (US); Greg Perkins, Boise, ID (US); Justin Johnson, Mountain Home, ID (US)

(73) Assignee: CradlePoint, Inc., Boise, ID (US)

( * ) Notice: Subject to any disclaimer, the term of this patent is extended or adjusted under 35 U.S.C. 154(b) by 91 days.

(21) Appl. No.: 18/984,664

(22) Filed: Dec. 17, 2024

(65) Prior Publication Data

US 2026/0172484 A1 Jun. 18, 2026

(51) Int. Cl.
*H04L 67/55* (2022.01)
*H04L 12/66* (2006.01)
*H04L 47/28* (2022.01)

(52) U.S. Cl.
CPC .............. *H04L 67/55* (2022.05); *H04L 12/66* (2013.01); *H04L 47/28* (2013.01)

(58) Field of Classification Search
CPC . H04L 51/21–214; H04L 12/66; H04L 67/55; H04L 47/28
See application file for complete search history.

(56) References Cited

U.S. PATENT DOCUMENTS

2009/0019124 A1 1/2009 Reynolds et al.
2018/0115616 A1* 4/2018 Srinivasan ............ H04L 67/141
2021/0211515 A1* 7/2021 Rozo ........................ H04L 67/12
2024/0223656 A1* 7/2024 Gomez ............... H04W 12/069

* cited by examiner

*Primary Examiner* — Jason D Recek
(74) *Attorney, Agent, or Firm* — Parsons Behle & Latimer

(57) ABSTRACT

Messaging systems and methods that include a network gateway configured to enable a client to publish and subscribe to messages, a community broker on the network gateway configured to communicate with a metabroker application, a remote broker application in communication with the metabroker application and in communication with a remote client the remote client comprising a message database, and wherein the remote client enables dynamic latency control of the reporting of messages in the message database to the network gateway.

10 Claims, 10 Drawing Sheets

PUBLISH/SUBSCRIBE MESSAGING WITH DYNAMIC LATENCY CONTROLLED COMBINING

FIELD OF THE DISCLOSURE

This disclosure relates generally to computer networking systems and methods. In particular, this disclosure relates to systems and methods for publish/subscribe messaging with dynamic latency controlled combining.

BACKGROUND

Publish and Subscribe messaging (publish/subscribe) is an effective way of disseminating information to multiple users. Publish/Subscribe applications can help to enormously simplify the task of getting business messages and transactions to a wide, dynamic and potentially large audience in a timely manner.

Publish/subscribe applications are typically written so that a "community" of clients with a common purpose all connect into a particular broker, to enable them to send and receive messages amongst themselves. An obvious example is producer/consumer applications, where one set of clients produce data and another set consume that data.

Most existing systems typically use Message Queuing Telemetry Transport (MQTT) protocols or a similar solution (such as AWS Green Grass or Azure IOT) to propagate data from an edge device running a community broker, to a remote broker, to a remote client in the cloud. One embodiment of MQTT is disclosed in U.S. Pat. No. 8,065,372, issued Nov. 22, 2011, titled "Publish/Subscribe Messaging," the contents of which is hereby incorporated by reference in its entirety. That disclosed MQTT became an OASIS ISO standard (ISO/IEC PRF 20922) in 2014. Most current solutions gather at a fixed cadence and report at a similar or greater fixed cadence without any support for combining samples and controlling reporting latency dynamically.

Other drawbacks, issues, and inconveniences with current Publish/Subscribe applications also exist.

SUMMARY

Accordingly, disclosed embodiments address the above drawbacks, issues, and inconveniences of current systems and methods. Disclosed embodiments include a messaging system including a network gateway configured to enable a client to publish and subscribe to messages, a community broker on the network gateway configured to communicate with a metabroker application, a remote broker application in communication with the metabroker application and in communication with a remote client the remote client comprising a message database, and wherein the remote client enables dynamic latency control of the reporting of messages in the message database to the network gateway.

Further disclosed embodiments include an NCM client on the network gateway that communicates with the metabroker application, and a message hold on the network gateway for storing and combining messages from a router store on the network gateway.

In further disclosed embodiments the dynamic latency control of the reporting of messages further includes reporting combined messages or single messages in series. In still further embodiments, the dynamic latency control further includes adjusting the reporting_period with respect to the sampling_period through the NCM Client. In still further embodiments, the dynamic latency control is enabled to target the network gateway by a particular device, group or account.

In some embodiments the community broker is configured to perform decimation. In some embodiments the decimation is based on bellwether topics. In further disclosed embodiments the bellwether topics comprise leaf nodes that represent a composite function of topics of user importance.

Also disclosed are methods of messaging in a network, including configuring a network gateway to enable a client to publish and subscribe to messages, configuring a community broker on the network gateway to communicate with a metabroker application, communicating from a remote broker application to the metabroker application and to a remote client the remote client comprising a message database, and wherein the remote client enables dynamic latency control of the reporting of messages in the message database to the network gateway.

In some embodiments the method includes communicating from an NCM client on the network gateway with the metabroker application and storing and combining messages from a router store on the network gateway in a message hold on the network gateway.

In some embodiments the community broker is configured to perform decimation. In some embodiments the decimation is based on bellwether topics. In some embodiments the bellwether topics comprise leaf nodes that represent a composite function of topics of user importance.

Other embodiments also exist.

Figure 1:
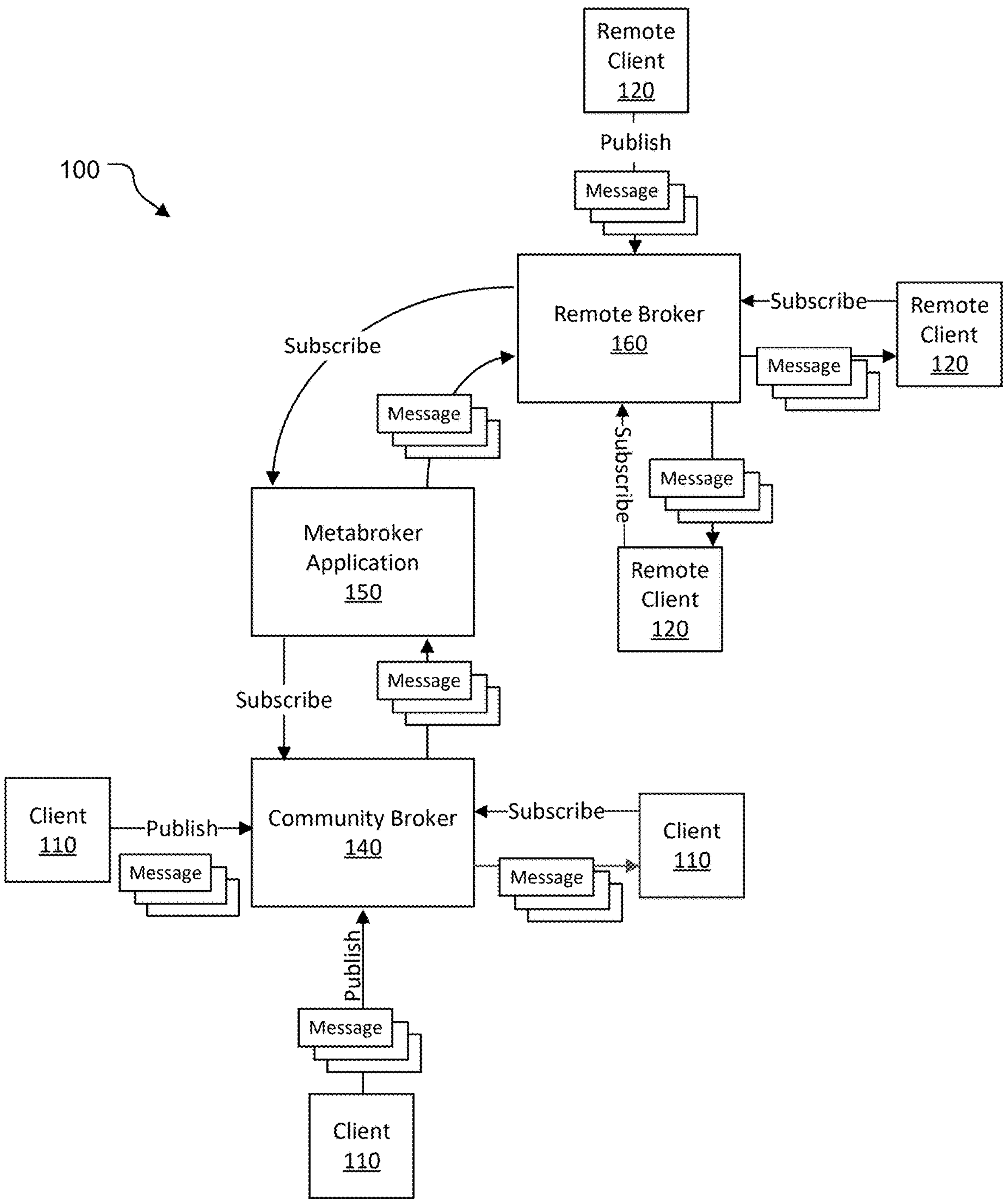
FIG. 1 (Prior Art)
FIG. 1 shows a schematic diagram of a publish/subscribe system of a preferred embodiment of the prior art.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

Referring to FIG. 1, a publish/subscribe messaging system 100 has a number of publish/subscribe clients 110 each connected to their local "community" broker 140. A "metabroker" application 150 is also a client to the "community" broker 140, and is permanently connected and subscribes to the wildcard topic "metabroker/#", (where '#' is the topic wildcard symbol), so that it receives all messages that have topics prefixed with the name "metabroker", e.g.: metabroker/a/b.

When a remote client 120 application wishes to gain access to a remote broker 160, it requests a connection to the "metabroker" 150 Java™ Message Service (JMS) service. This JMS service is in practice a software library (comprising a JMS API—Application Programming Interface, a metabroker JMS TopicConnectionFactory (TCF) and a community JMS TCF) running on the remote client 120, which gives the remote client 120 application the impression that it is making a connection to a remote broker 160, but is in fact making use of the "normal" (existing) connection to the community broker 140 to send special messages to the metabroker 150, by publishing messages to the community broker 140 which the metabroker 150 receives as a subscriber. The metabroker 150, in turn, connects to the required remote broker 160 and proxies messages back and forth to the client application (e.g., 110, 120), all via publish/subscribe through the community broker 140. In effect, this may be considered as "pub/sub over pub/sub" configuration.

Figure 2:
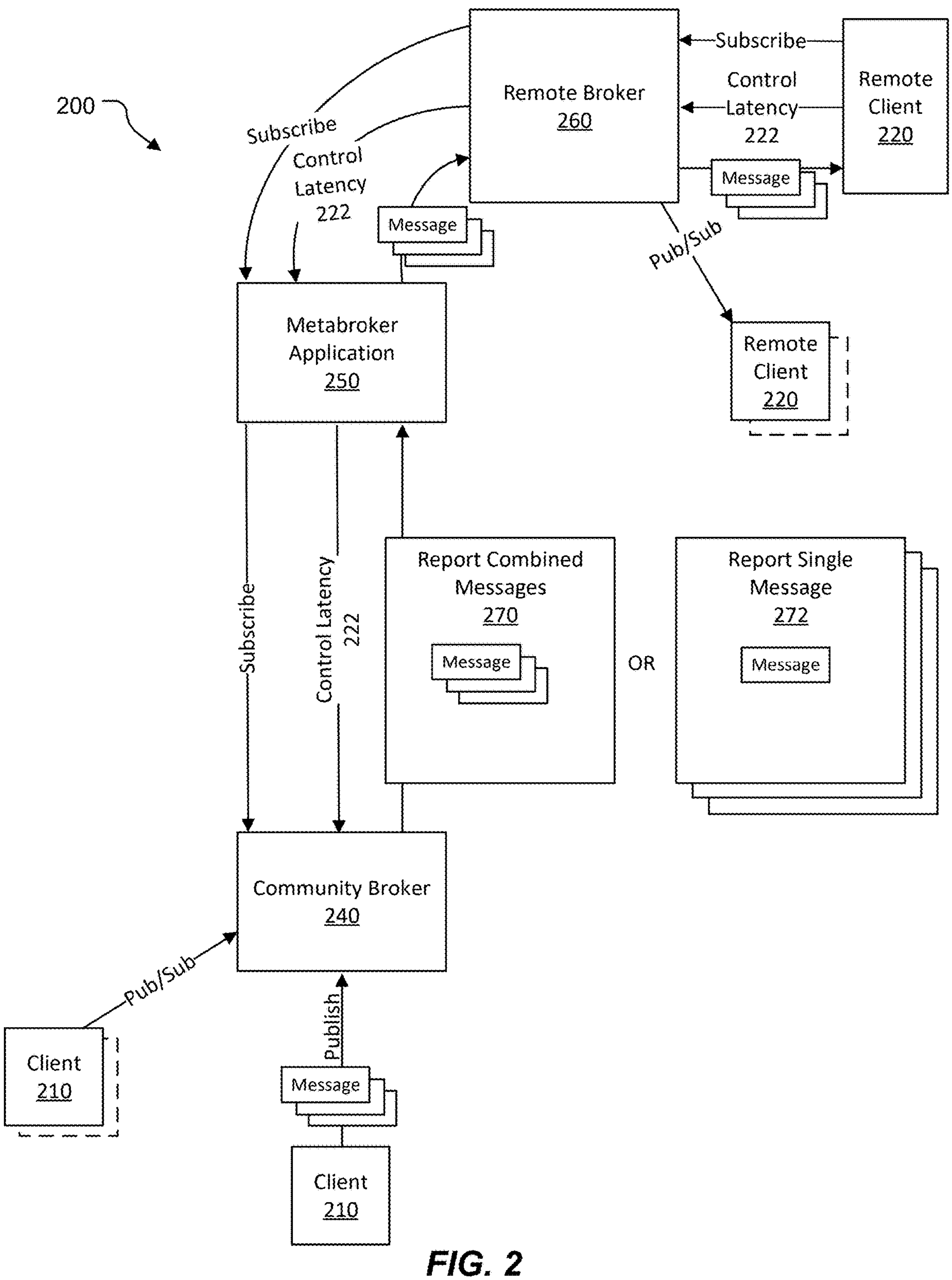
FIG. 2 is a schematic diagram of a message brokering system in accordance with disclosed embodiments.

FIG. 2 is a schematic diagram of a message brokering system 200 in accordance with disclosed embodiments. As illustrated message brokering system 200 for connecting a client 210 in a local publish/subscribe messaging system (for example in a local area network) via a metabroker application 250 to a remote message broker 260 (for example via a wide area network connection) with a remote client 220 (e.g. running in the cloud) where the remote client 220 enables dynamic latency control 222 of the reporting of messages either combined 270 or singly 272 from the local messaging system's Community Broker 240. In some embodiments reporting combined messages 270 optimizes wire usage at the expense of latency in the delivery of the messages. Additionally, reporting of combined messages 270 or a series of reports of single messages 272 may be based on latency requirements controlled from the remote client 220 and can change dynamically. Embodiments of remote broker 260 may employ a minimum latency selected across subscribing clients'(e.g., 210, 220) requirements.

Figure 3:
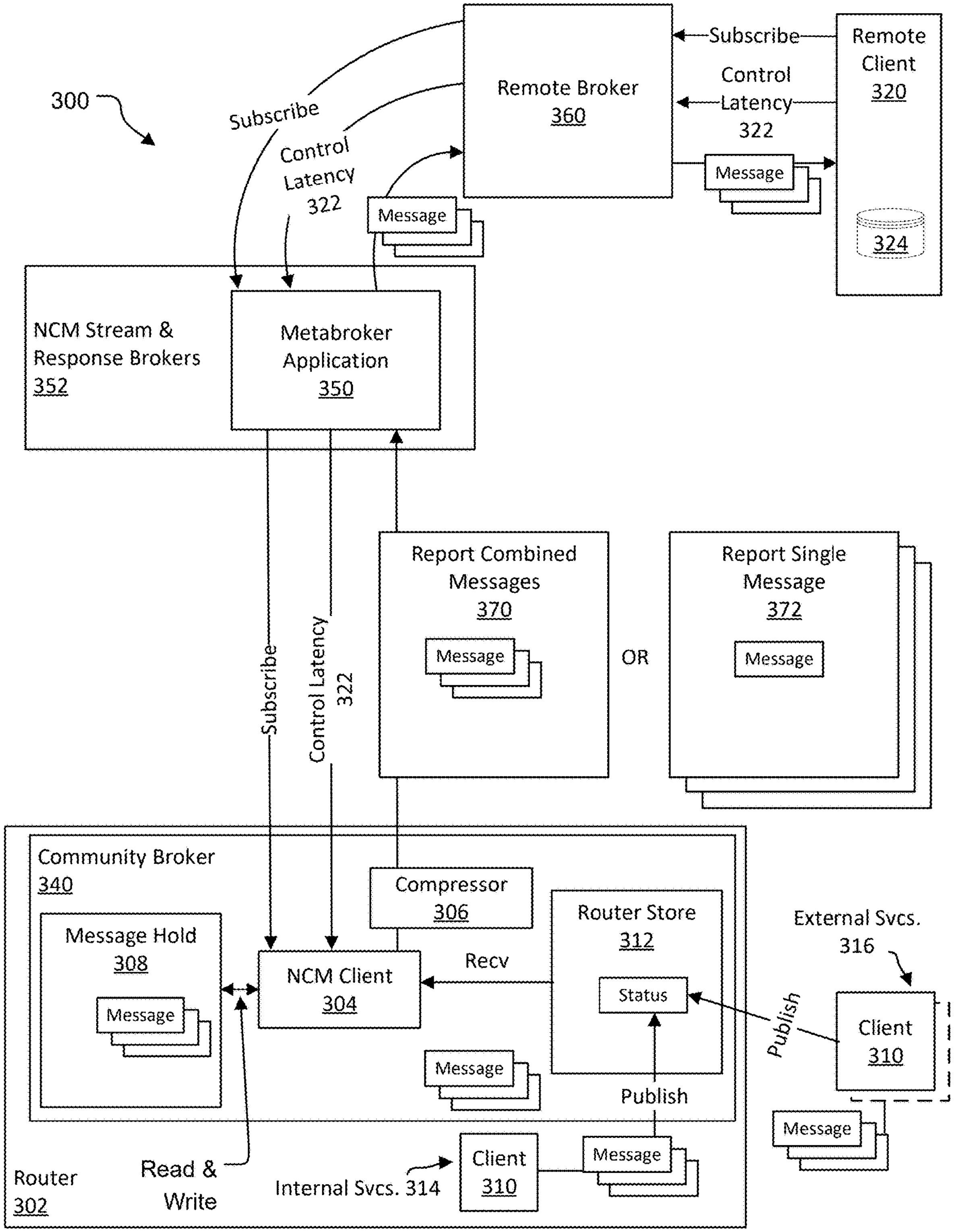
FIG. 3 is an embodiment of a messaging system as implemented in a router or other network gateway in accordance with disclosed embodiments.

FIG. 3 is an embodiment of a messaging system 300 as implemented with a router 302, or other network gateway, in accordance with disclosed embodiments. As illustrated, clients 310 publish/subscribe to messages using either internal services 314 or external services 314 of router 302. Similarly to the embodiment in FIG. 2, the Remote Client 320, which may optionally comprise a message database 324, can dynamically control the latency 322 or reporting of message(s) (e.g., combined messages 370 or single message(s) 372 in series) from the Community Broker 340 on the Router 302 by adjusting the reporting_period with respect to the sampling_period through an API (e.g., Net Cloud Manager ("NCM Client 304) as provided by Cradlepoint, Inc., of Boise, Idaho) that can target the router 302 by a particular device, group or account. Embodiments of NCM client 304 also communicate with NCM stream and response brokers 352 and metabroker application 350 in the cloud or other remote servers.

For example changing the reporting period from 5 seconds may be represented as:

```
{"sampling_period": 5,
"reporting_period": 5,
},
```

Changed to one hour (3600 seconds) represented as:

```
{"sampling_period": 5,
"reporting_period": 3600,
},
```

Such a change will result in combining approximately 720 messages in a single report shown at 370. As also illustrated, compressor 306 may highly compress combined messages 370 or may marginally compress single messages 372.

The Community Broker 34 on the Router 302 contains a Message Hold 308 where the messages received from the Routers' Store 312 can be held in memory until combined in a single Report 370 based on the reporting_period. In some embodiments the combined report 370 is lossless compressed with compressor 306 for optimal wire usage.

Figure 4:
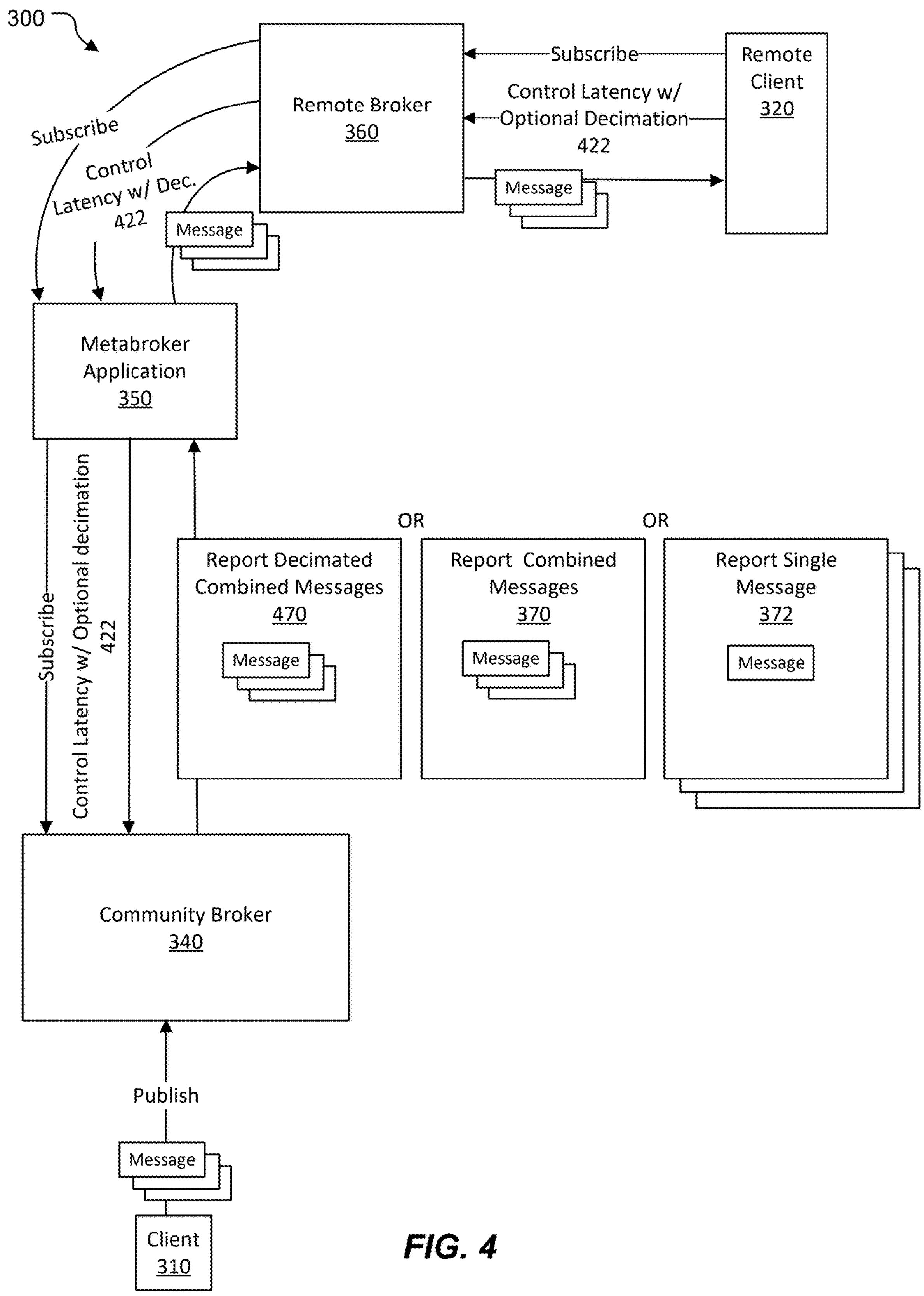
FIG. 4 is a schematic illustration of a portion of messaging system 300 with optional decimation for non-zero latencies in accordance with disclosed embodiments.

FIG. 4 is a schematic illustration of a portion of the messaging system 300 with optional decimation for nonzero latencies in accordance with disclosed embodiments. Some embodiments may add optional decimation (i.e., a type of lossy compression) to achieve even better wire usage. For example, message brokering system 300 for connecting a client 310 in a local publish/subscribe messaging system 300 (for example, in a local area network) to a remote message broker 360 (for example, via a wide area network connection) with a remote client 320 (e.g. running in the cloud) where the remote client 320 has the means to dynamically control 422 the reporting of messages from the local messaging system's Community Broker 340 with respect to combing messages 370 or 372 to optimize wire usage at the expense of latency in the delivery of the messages and optionally perform decimation 422 also (e.g., based on bellwether topics) for nonzero latencies and report the decimated combined messages 470.

Figure 5:
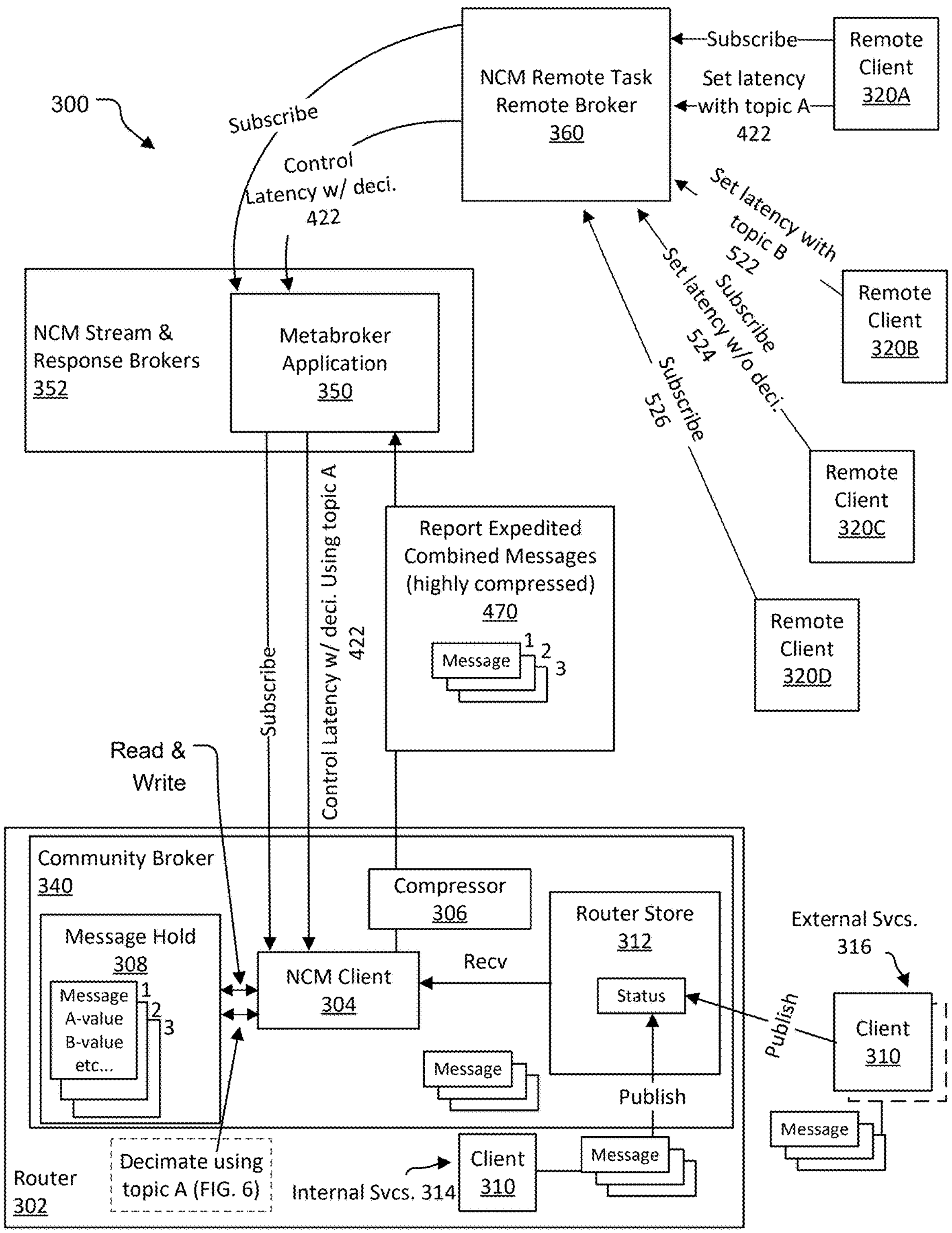
FIG. 5 is an embodiment of a messaging system 300 as implemented with a router 302, or other network gateway, with optional decimation for non-zero latencies in accordance with disclosed embodiments.

FIG. 5 is an embodiment of a messaging system 300 as implemented with a router 302, or other network gateway, with optional decimation for non-zero latencies in accordance with disclosed embodiments. As illustrated schematically, optional decimation 422 may be implemented to hold messages based on bellwether topics (e.g., topics A, B, C, . . . , etc.) each having a corresponding value (e.g., A-value, B-value, . . . , etc.) as discussed in connection with FIG. 6 below. Embodiments may implement bellwether topics that are, typically, leaf nodes that represent a composite function of other topics of user importance (e.g., a calculated WAN health score, or the like). As illustrated schematically, remote client 320A may set latency with optional decimation using topic A (shown at arrow 422) as the bellwether. Router 302 implements community broker 340 and NCM client 304 to decimate messages (e.g., message 1, message 2, message 3, etc.) using topic A and A-value as the bellwether. The decimated combined messages may be reported as indicated at 470. In some embodiments, decimated combined messages 470 may also be highly compressed (e.g., using compressor 306).

As also indicated, if a second remote client 320B subscribes with a non-zero latency and optimal decimation using topic B as the bellwether as indicated at 522, then the minimum latency for both topic A and topic B will be used for decimation. Likewise, if a third remote client 320C subscribes with a non-zero latency and no optional decimation as indicated at 524, then the minimum latency will be used without decimation. Likewise, if a fourth remote client 320D subscribes with a zero or no latency as indicated at 526, then no combining or decimation will take place. Other embodiments are also possible as would be apparent to those of ordinary skill in the art having the benefit of this disclosure.

Figure 6A:
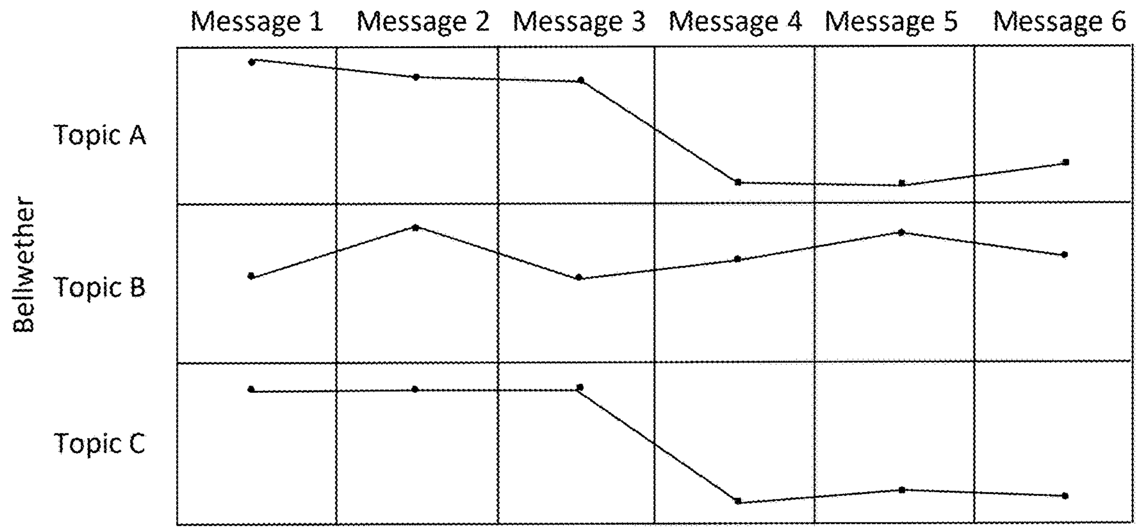
FIGS. 6A-6C are a schematic example of decimation of held messages based on bellwether topics in accordance with disclosed embodiments.
Figure 6B:
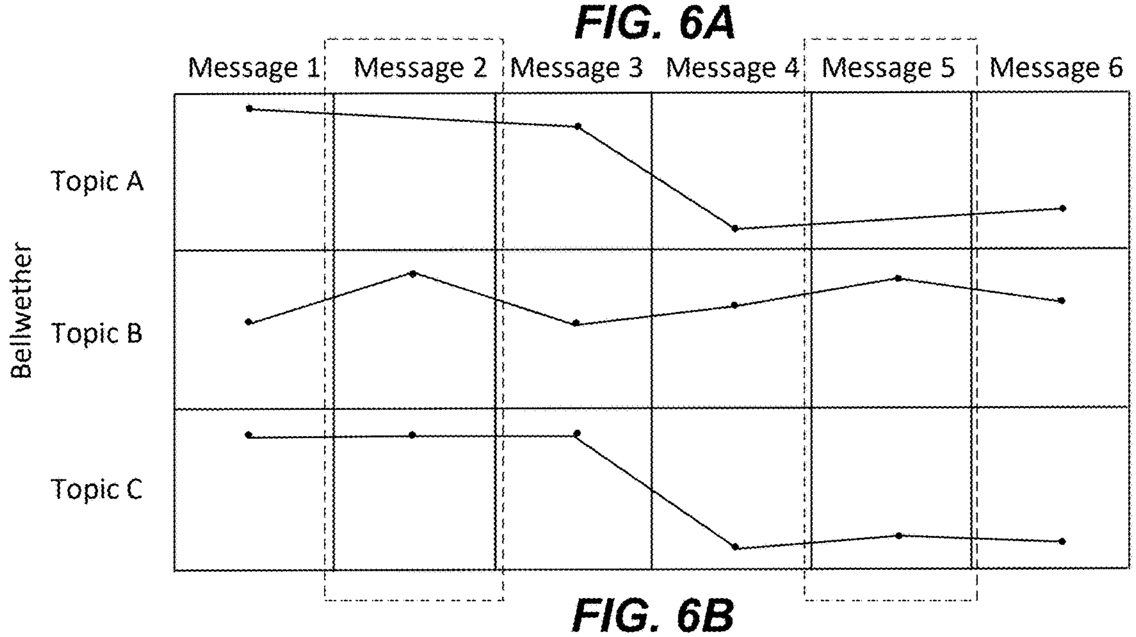
Figure 6C:
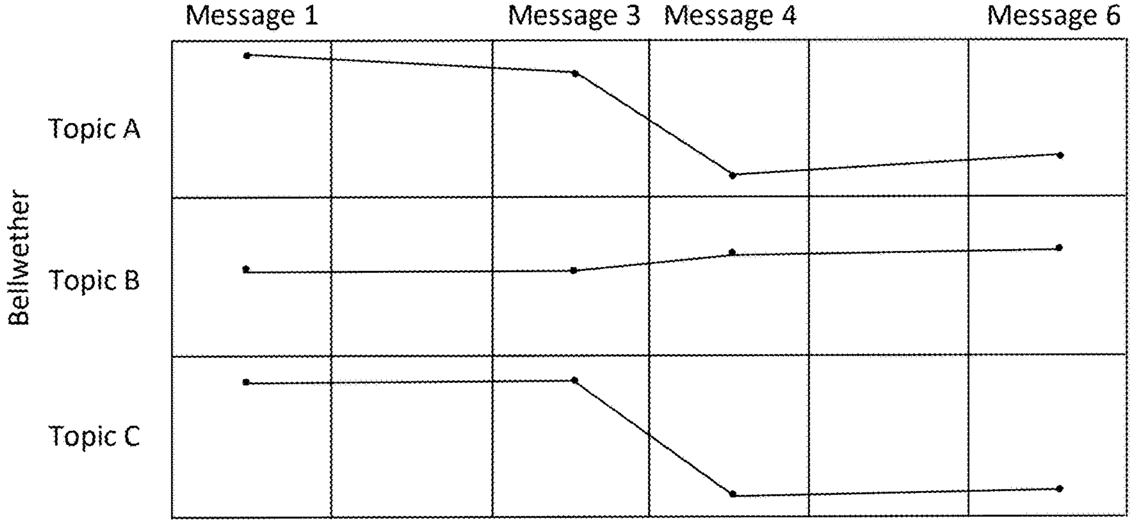

FIGS. 6A-6C are a schematic example of decimation of held messages based on bellwether topics in accordance with disclosed embodiments. As illustrated in FIG. 6A messages 1-6 will have bellwether values for topics A-C as indicated schematically. Next, an appropriate decimation algorithm may be applied (e.g., the Ramer-Douglas-Peucker ("RDP") algorithm, or the like). For example, under the RDP algorithm data points a specified amount above or below a threshold may be removed as "uninteresting" data points. This is illustrated schematically in FIG. 6B for topic A, message 2 and message 5 (shown in dashed boxes). Next, as illustrated in FIG. 6C, all held messages that no longer have data point for the bellwether topic (in this example, topic A) are removed after decimation is applied (in this example, message 2 and message 5). Other decimation techniques are also possible.

Figure 7:
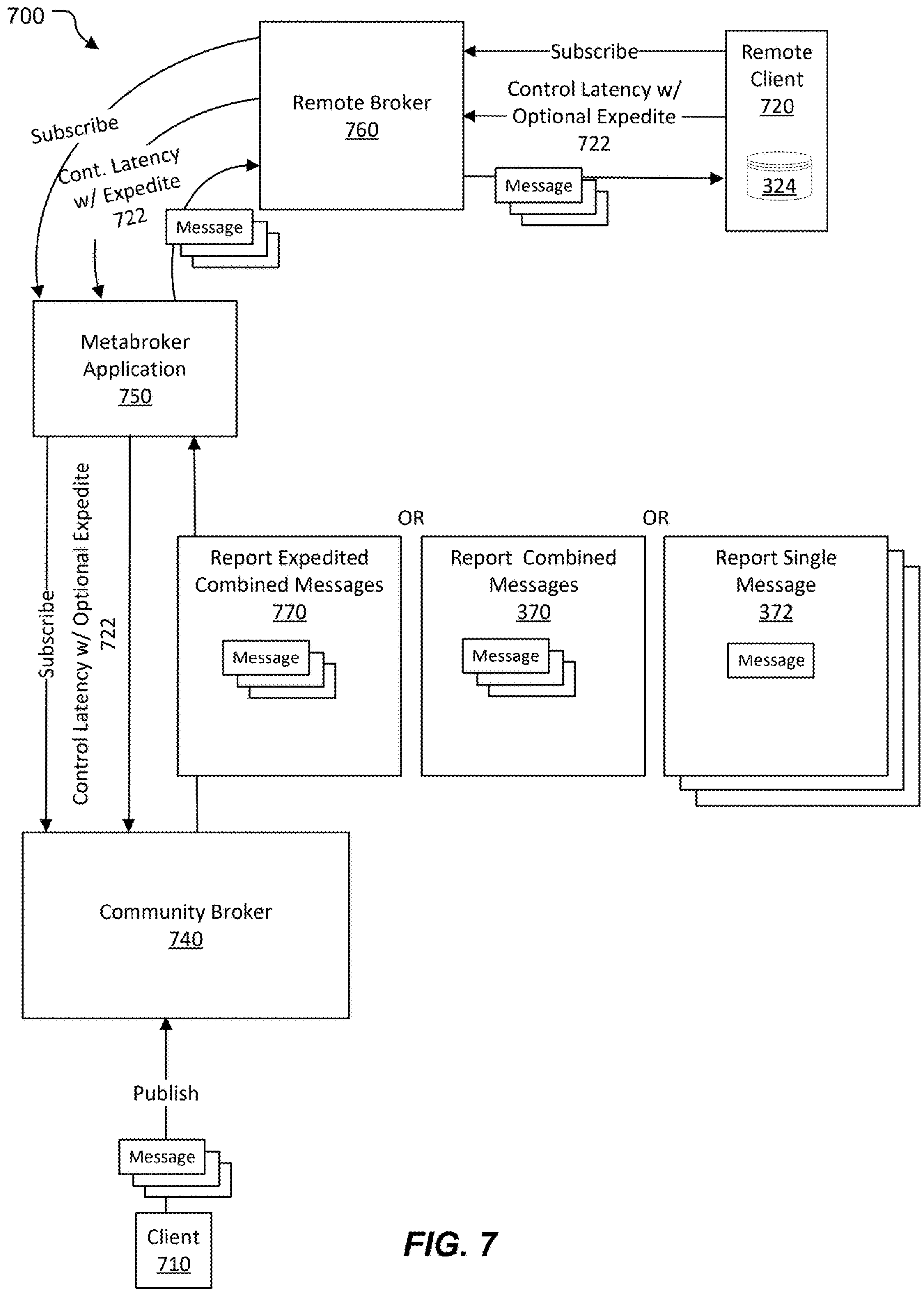
FIG. 7 is a schematic illustration of a portion of the messaging system 700 with optional expedited reporting for non-zero latencies in accordance with disclosed embodiments.

FIG. 7 is a schematic illustration of a portion of the messaging system 700 with optional expedited reporting for non-zero latencies in accordance with disclosed embodiments. Some embodiments may add optional expedited reporting (i.e., priority reporting) to achieve even better wire usage. For example, message brokering system 700 for connecting a client 710 in a local publish/subscribe messaging system 700 (for example, in a local area network) to a remote message broker 760 (for example, via a wide area network connection) with a remote client 720 (e.g. running in the cloud) where the remote client 720 has the means to dynamically control 722 the reporting of messages from the local messaging system's Community Broker 740 with respect to combing messages 370 or 372 to optimize wire usage at the expense of latency in the delivery of the messages and optionally perform expedited reporting 770 also (e.g., based on bellwether topics) for nonzero latencies and report the expedited combined messages 770. As noted herein, reported expedited combined messages 770 may be highly compressed, as may reported combined messaged 370, and reported single messages 372 may be marginally compressed. Other configurations are also possible.

Figure 8:
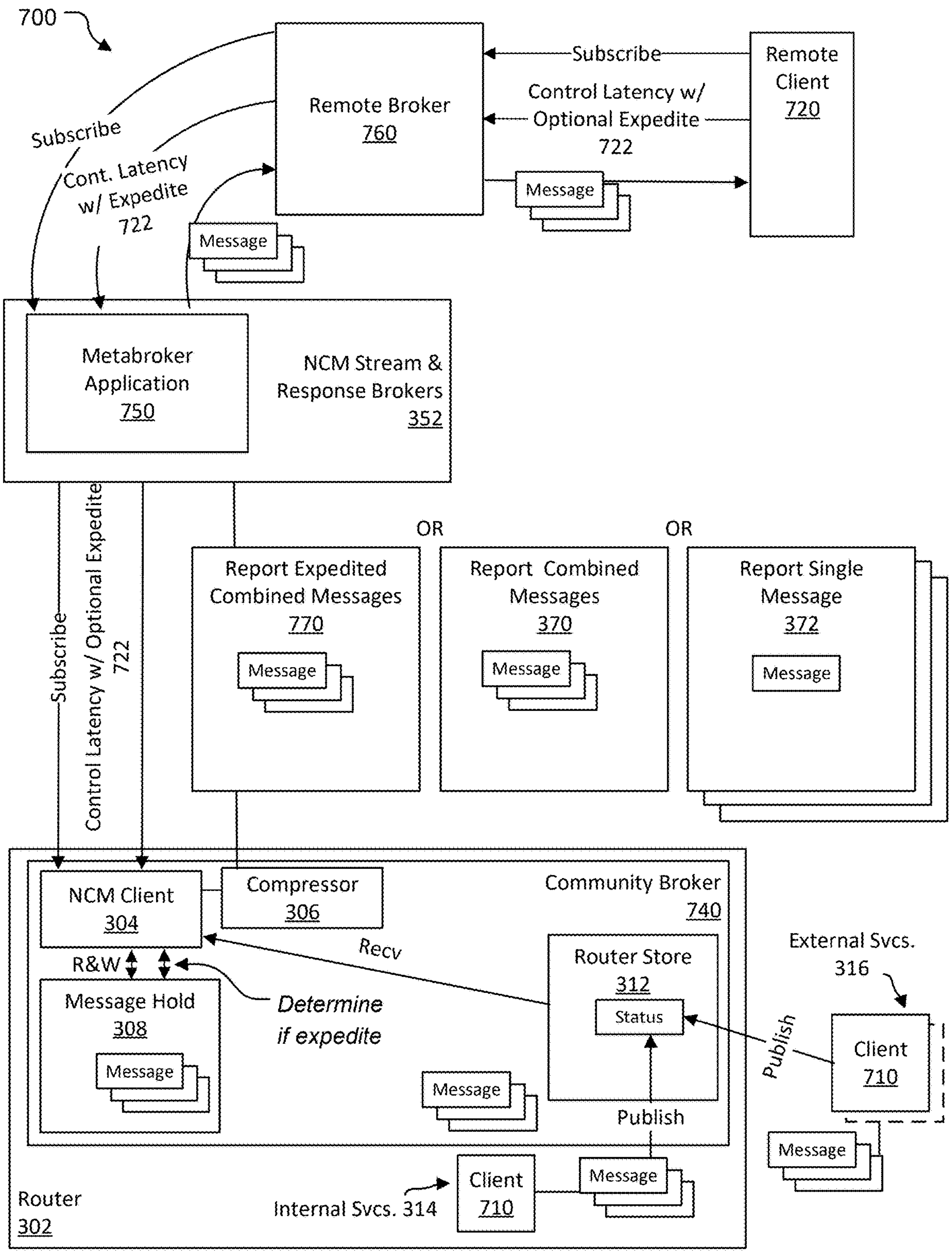
FIG. 8 is an embodiment of a messaging system 700 as implemented with a router 302, or other network gateway, in accordance with disclosed embodiments.

FIG. 8 is an embodiment of a messaging system 700 as implemented with a router 302, or other network gateway, in accordance with disclosed embodiments. As illustrated, clients 710 publish/subscribe to messages using either internal services 314 or external services 314 of router 302. Similarly to the embodiment in FIG. 7, the Remote Client 720, which may optionally comprise a message database 324, can dynamically control the latency 722 or reporting of message(s) (e.g., combined messages 370 or single message(s) 372 in series) from the Community Broker 740 on the Router 302 based on, for example, latency requirements and optional expedite parameters controlled from Remote Client 720 that can dynamically change. Embodiments of NCM client 304 also communicate with NCM stream and response brokers 352 and metabroker application 750 in the cloud or other remote servers.

Figure 9:
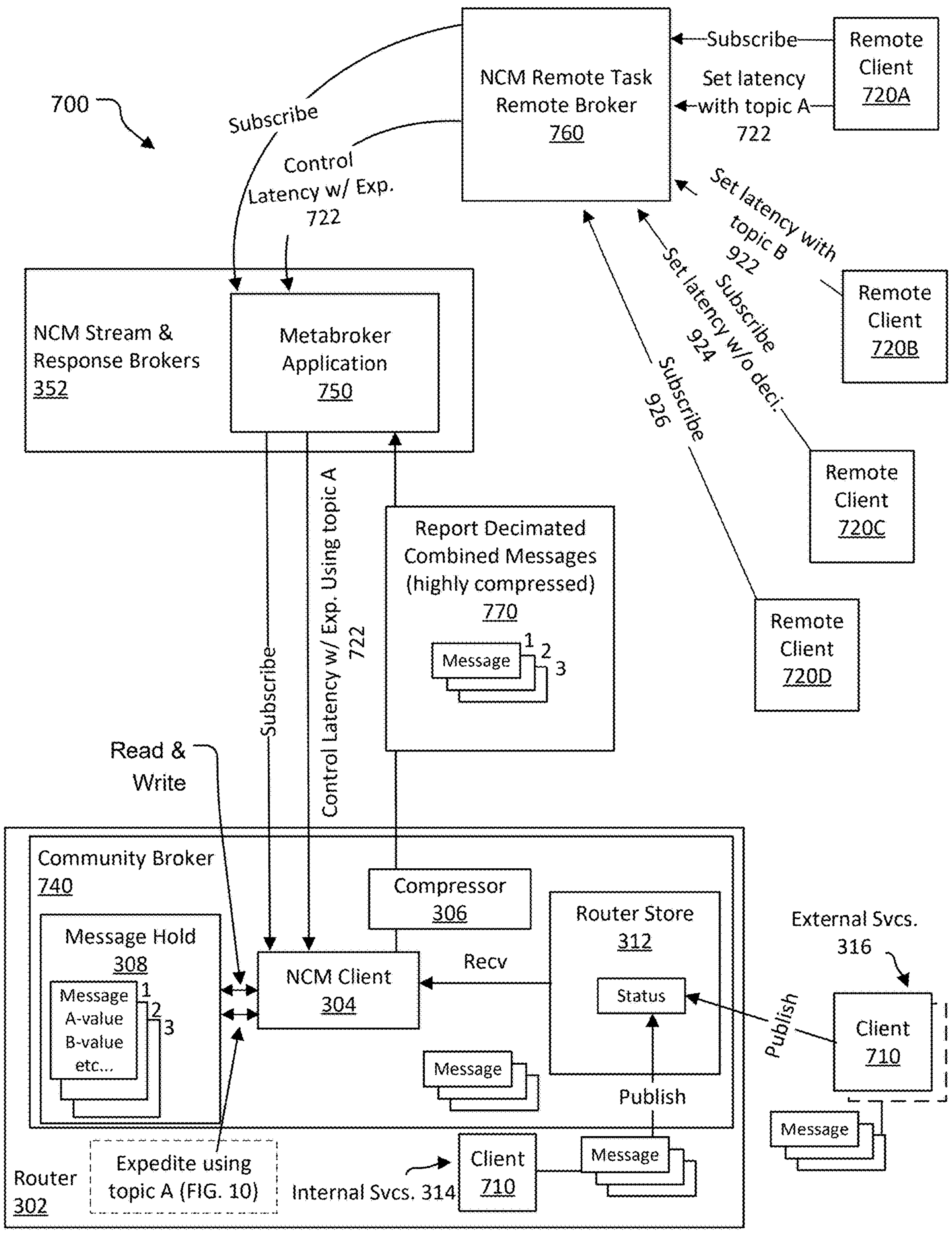
FIG. 9 is an embodiment of a messaging system 700 as implemented with a router 302, or other network gateway, with optional expedited reporting for non-zero latencies in accordance with disclosed embodiments.

FIG. 9 is an embodiment of a messaging system 700 as implemented with a router 302, or other network gateway, with optional expedited reporting for non-zero latencies in accordance with disclosed embodiments. As illustrated schematically, optional expediting 722 may be implemented to hold messages based on bellwether topics (e.g., topics A, B, C, . . . , etc.) each having a corresponding value (e.g., A-value, B-value, . . . , etc.) as discussed in connection with FIG. 10 below. Embodiments may implement bellwether topics that are, typically, leaf nodes that represent a composite function of other topics of user importance (e.g., a calculated WAN health score, or the like). As illustrated schematically, remote client 720A may set latency with optional expediting using topic A (shown at arrow 722) as the bellwether. Router 302 implements community broker 740 and NCM client 304 to decide whether to expedited messages (e.g., message 1, message 2, message 3, etc.) using topic A and A-value as the bellwether. The expedited combined messages may be reported as indicated at 770. In some embodiments, expedited combined messages 770 may also be highly compressed (e.g., using compressor 306).

As also indicated, if a second remote client 720B subscribes with a non-zero latency and optimal expediting using topic B as the bellwether as indicated at 922, then the minimum latency for both topic A and topic B will be used for expediting. Likewise, if a third remote client 720C subscribes with a non-zero latency and no optional expediting as indicated at 924, then the minimum latency will be used without decimation. Likewise, if a fourth remote client 720D subscribes with a zero or no latency as indicated at 926, then no combining or decimation will take place. Other embodiments are also possible as would be apparent to those of ordinary skill in the art having the benefit of this disclosure.

Figure 10A:
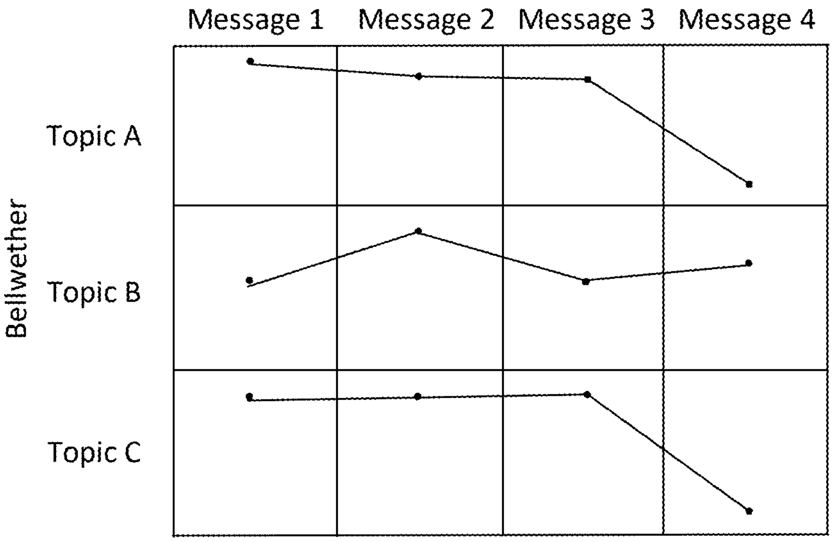
FIGS. 10A-10C are a schematic example of expedited reporting of held messages based on bellwether topics in accordance with disclosed embodiments.
Figure 10B:
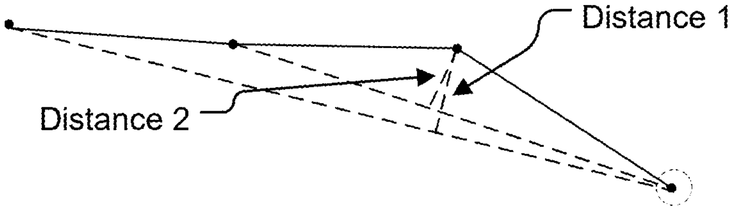
Figure 10C:
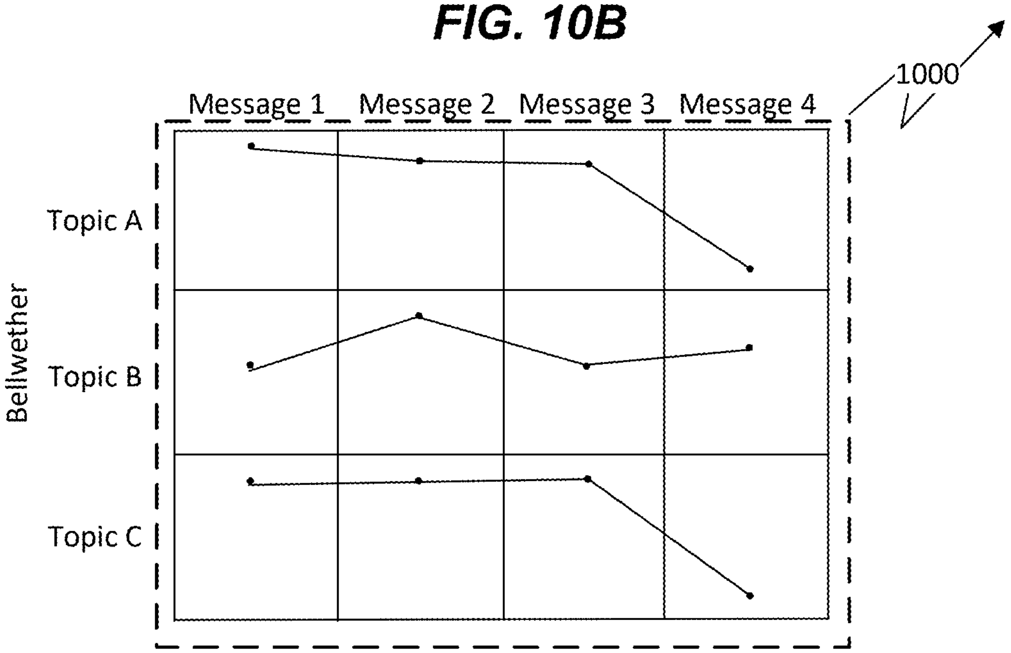

FIGS. 10A-10C are a schematic example of expedited reporting of held messages based on bellwether topics in accordance with disclosed embodiments. As illustrated in FIG. 10A messages 1-4 will have bellwether values for topics A-C as indicated schematically. Next, as illustrated schematically in FIG. 10B, an appropriate anomalous trajectory change algorithm may be applied (e.g., the Hausdorff distance, or the like) to determine, for example, if distance 1 or distance 2 exceed a threshold. Next, as illustrated in FIG. 10C, all held messages (e.g., messages 1-4) are expedited as indicated at arrow 1000 based on message 4 bellwether topic A before a reporting latency is reached. Other decimation techniques are also possible.

Although various embodiments have been shown and described, the present disclosure is not so limited and will be understood to include all such modifications and variations would be apparent to one skilled in the art.

What is claimed is:

1. A messaging system comprising:

a network gateway configured to enable a client to publish and subscribe to messages;

a community broker on the network gateway configured to communicate with a metabroker application wherein the community broker is configured to perform decimation based on bellwether topics comprising leaf nodes that represent a composite function of topics of user importance;

a remote broker application in communication with the metabroker application and in communication with a remote client the remote client comprising a message database; and wherein the remote client enables dynamic latency control of the reporting of messages in the message database to the network gateway.

2. The messaging system of claim 1 further comprising:
a Net Cloud Manager ("NCM") client on the network gateway that communicates with the metabroker application; and
a message hold on the network gateway for storing and combining messages from a router store on the network gateway.

3. The messaging system of claim 1 wherein dynamic latency control of the reporting of messages further comprises reporting combined messages or single messages in series.

4. The messaging system of claim 2 wherein dynamic latency control further comprises adjusting a reporting period with respect to a sampling period through the NCM Client.

5. The messaging system of claim 4 wherein dynamic latency control is enabled to target the network gateway by a particular device, group or account.

6. A method of messaging in a network, the method comprising:
configuring a network gateway to enable a client to publish and subscribe to messages;
configuring a community broker on the network gateway to communicate with a metabroker application wherein the community broker is configured to perform decimation based on bellwether topics comprising leaf nodes that represent a composite function of topics of user importance;
communicating from a remote broker application to the metabroker application and to a remote client the remote client comprising a message database; and
wherein the remote client enables dynamic latency control of the reporting of messages in the message database to the network gateway.

7. The method of messaging of claim 6 further comprising:
communicating from a Net Cloud Manager ("NCM") client on the network gateway with the metabroker application; and
storing and combining messages from a router store on the network gateway in a message hold on the network gateway.

8. The method of messaging of claim 7 wherein dynamic latency control further comprises adjusting a reporting_period with respect to a sampling_period through the NCM Client.

9. The method of messaging of claim 8 wherein dynamic latency control is enabled to target the network gateway by a particular device, group or account.

10. The method of messaging of claim 6 wherein dynamic latency control of the reporting of messages further comprises reporting combined messages or single messages in series.

* * * * *